United States Patent [19]

Yamauchi

[11] 4,004,354
[45] Jan. 25, 1977

[54] GROUP RESPONSE ANALYZING SYSTEM
[75] Inventor: Satoshi Yamauchi, Tokyo, Japan
[73] Assignee: Ricoh Co., Ltd., Tokyo, Japan
[22] Filed: Sept. 25, 1972
[21] Appl. No.: 291,620

[30] Foreign Application Priority Data
Sept. 30, 1971 Japan .................. 46-76737
[52] U.S. Cl. ................................. 35/48 R
[51] Int. Cl.² ............................ G09B 5/14
[58] Field of Search .......... 35/5, 6, 8 R, 9 R, 9 A, 35/9 B, 10, 35 R, 35 B, 35 C, 35 D, 48 R

[56] References Cited
UNITED STATES PATENTS

| | | | |
|---|---|---|---|
| 3,270,438 | 9/1966 | Ephraim | 35/5 |
| 3,460,270 | 8/1969 | Blitz et al. | 35/8 R X |
| 3,579,861 | 5/1971 | Hallett | 35/48 R |
| 3,647,926 | 3/1972 | Rohloff et al. | 35/48 R |

Primary Examiner—Richard C. Pinkham
Assistant Examiner—Vance Y. Hum
Attorney, Agent, or Firm—Cooper, Dunham, Clark, Griffin & Moran

[57] ABSTRACT

In a group response analyzing system of the type comprising a central console for a questioner and a plurality of response or terminal consoles for questionees intercommunicated with the central console so that the responses may be automatically collected from the response consoles and processed and the results of processing may be displayed, the intercommunication channel comprises scanning lines between the central console and each of the terminal consoles and a common information line between the central console and the terminal consoles so that the intercommunication between the central console and the terminal consoles may be established sequentially through said common information line when said terminal consoles are sequentially selected by the scanning lines.

4 Claims, 18 Drawing Figures

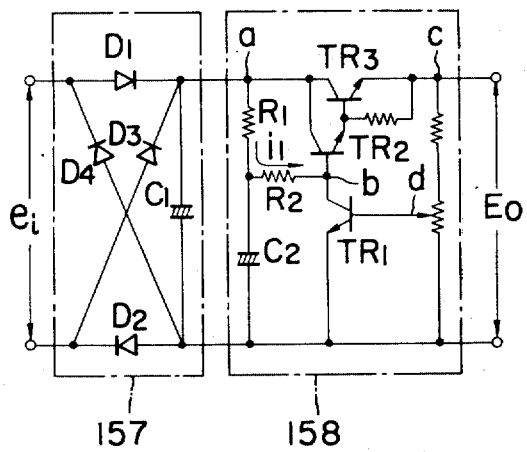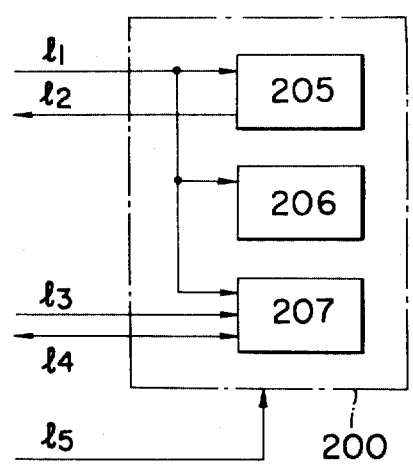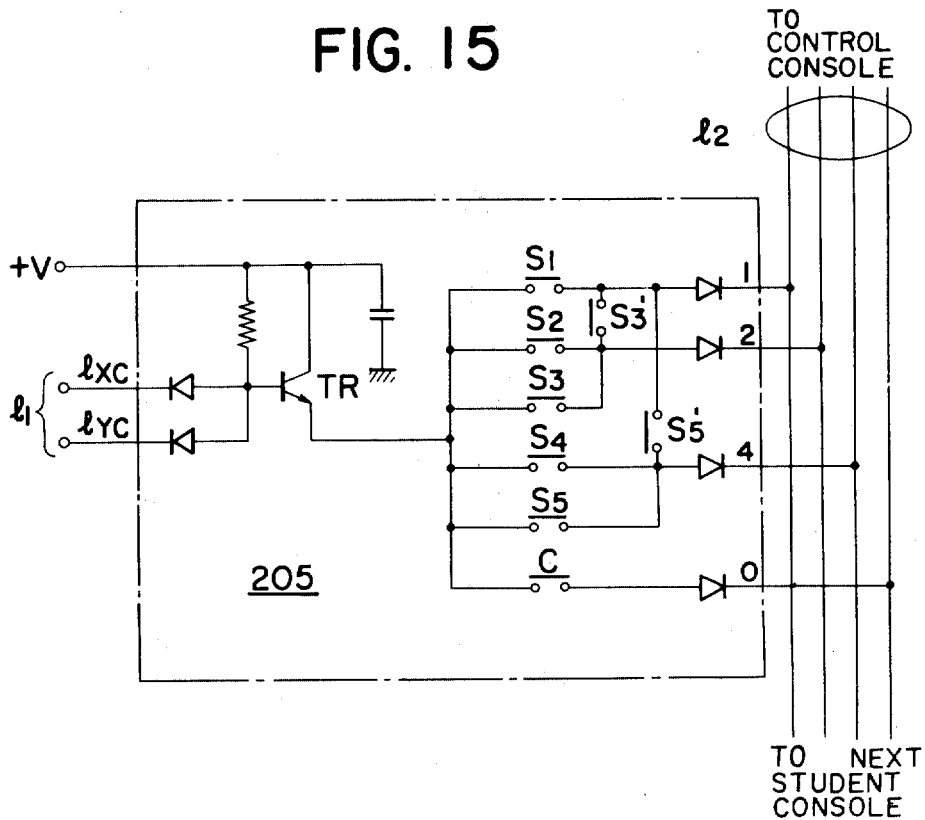

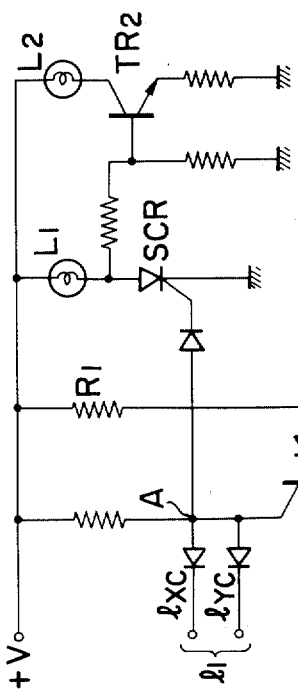
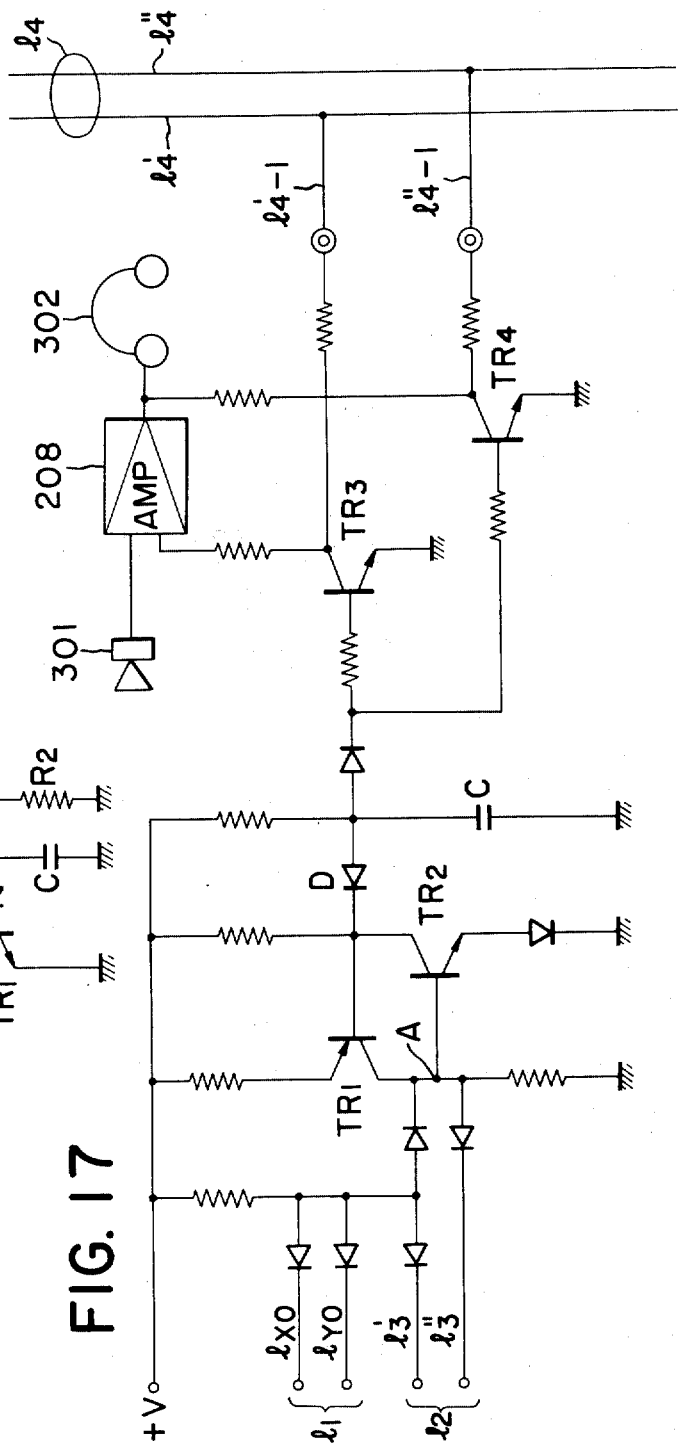
FIG. 16
FIG. 17

GROUP RESPONSE ANALYZING SYSTEM

BACKGROUND SUBJECTS AND SUMMARY OF THE INVENTION

The present invention relates to a group response analyzing system which may be applied to a group teaching system or may be used to analyze the different respones to a questionaire of the individuals in a specific group.

The group response analyzing system has been recently widely used in order to instantaneously analyze or process the different answers or responses from a large number of students or questionees to a specific question which is questioned to them simultaneously. The group response analyzing system generally comprises a central console for a teacher or questioner and a plurality of terminal response or student consoles for questionees or students. The central console may automatically collect the answers or responses from the terminal consoles and may analyze or process them and display the result of the analysis or processing, and the terminal console has a plurality of response or answer buttons so that a questionee or student may select one of them according to his judgement and a pair of indicating lamps for indicating whether the student selected the correct answer or not. The question may be transmitted directly from the central console to the terminal consoles or may be given from peripheral or auxiliary equipment such as a teaching machine connected to each terminal console. The answer or response from the terminal console is transmitted to the central console through an intercommunication channel. In addition to the analysis or processing of the answers or responses, the central console may transmit the correct and wrong signals to the terminal consoles for turning on the correct or wrong indicating lamp on each terminal console so that a student may know the result of his answer.

The conventional group response analyzing system includes a plurality of intercommunication lines between the central console and the terminal consoles such as communication lines for establishing the intercommunication between the questioner or teacher and the questionees or students, response or answer lines for transmitting the response or answer signals from the terminal consoles to the central console, lines for transmitting the signals to the terminal consoles for turning on a correct or wrong indicating lamp and the like. Therefore the number of lines interconnecting the central and terminal consoles is increased. Furthermore the central console has a simple display device such as a meter or a pen recorder for displaying for example the correct-answer ratio, that is the ratio of the number of students who selected the correct answer to the whole number of students so that the display device is not satisfactory in intelligibility, response and versatility.

One of the objects of the present invention is therefore to provide a group response analyzing system which may overcome the above and other problems encountered in the conventional system.

Another object of the present invention is to provide a group response analyzing system in which a number of intercommunication lines between the central console and the terminal consoles may be minimized.

Another object of the present invention is to provide a group response analyzing system in which the central console may accomplish a variety of versatile functions.

Briefly stated, the group response analyzing system in accordance with the present invention generally comprises a central console for a questioner or teacher and a plurality of terminal response consoles for questionees or students interconnected with the central console through a communication channel consisting of scanning lines and information lines. The terminal response consoles are sequentially selected by the time-division scanning system, and various informations may be exchanged between the central and terminal console when the latter is selected. In addition to the functions of transmitting and receiving various informations to and from the terminal response consoles, the central console may analyze or process the received responses or answers and display the results of the analyzes or processing by analog and/or digital display devices.

The above and other objects, features and advantages of the present invention will become more apparent from the following description of one preferred embodiment thereof taken in conjunction with the accompanying drawing.

BRIEF DESCRIPTION OF THE DRAWING

FIG. 13 is a circuit diagram of a power circuit used in the central console;

FIG. 14 is a block diagram of the terminal student console;

FIG. 15 is a circuit diagram of a response or answer signal generating circuit;

FIG. 16 is a circuit diagram of a display circuit in the terminal student console for turning on an indicating lamp in order to indicate a student whether his answer is correct or not;

FIG. 17 is a circuit diagram of a communication circuit in the terminal student console.

DESCRIPTION OF THE PREFERRED EMBODIMENT:

The group response analyzing system in accordance with the present invention will be described as being applied to a group teaching system which uses the multiple-choice system so that a student must choose one of the five answers to a specific question.

Figure 1:
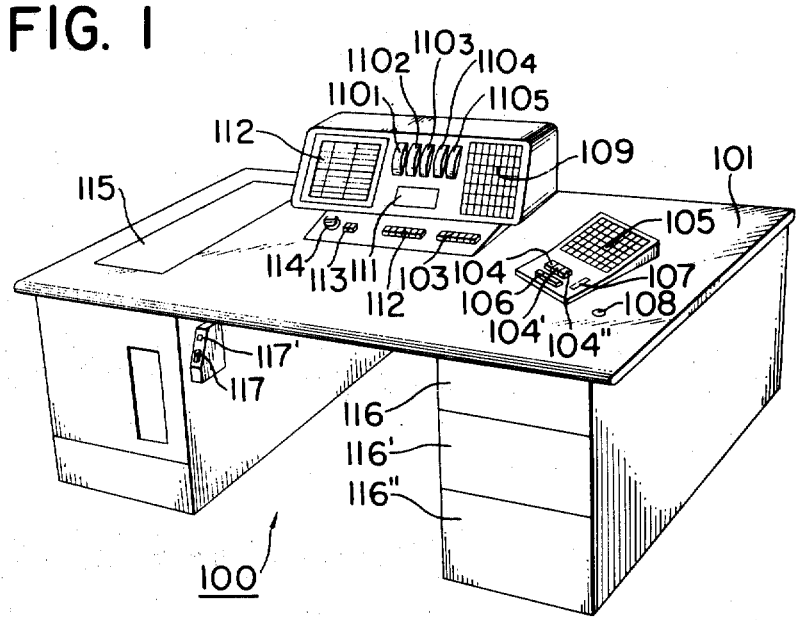
FIG. 1 is a perspective view of a central console used in the group response analyzing system in accordance with the present invention.

Referring to FIG. 1, a central console generally designated by 100 has a table 101 upon which are arranged a set of five correct answer setting buttons 102 for indicating a correct answer out of five answers and a set of five response selection buttons 103 to be described in more detail hereinafter. The correct-answer setting buttons 102 are green whereas the response-selection buttons 103 are red in order to distinguish them clearly and to prevent a teacher from pressing a wrong button. On the right side of the table 101 is disposed an intercommunication unit comprising selection switches 104, 104' and 104" for selecting one of the three communication modes, individual-student-calling switches 105, a chime button 106, a volume control 107, and a headphone jack 108.

On the front side of the table 101 are disposed a display panel 109 for displaying the student seats or positions; meters $110_1$–$110_5$ for an analog representation of the response ratio, that is, the ratio of the number of students who selected a specific answer to the total number of students; a meter 111 for making a digital representation of the correct response ratio; and graphic panel 112 for displaying a number of students who gave the answers as a function of a time. The scale of the time axis or abscissa of the graphic panel 112 may be adjusted by a dial 113 as will be described in more detail hereinafter. The central console 100 further comprises a dial 114 for setting a timer, a paper tape punch 115 for recording the response data, three drawers 116, 116' and 116" for storing teaching materials such as magnetic sheets, a power switch 116, and a pilot lamp 117 for indicating that the power switch 116 is closed.

Figure 2:
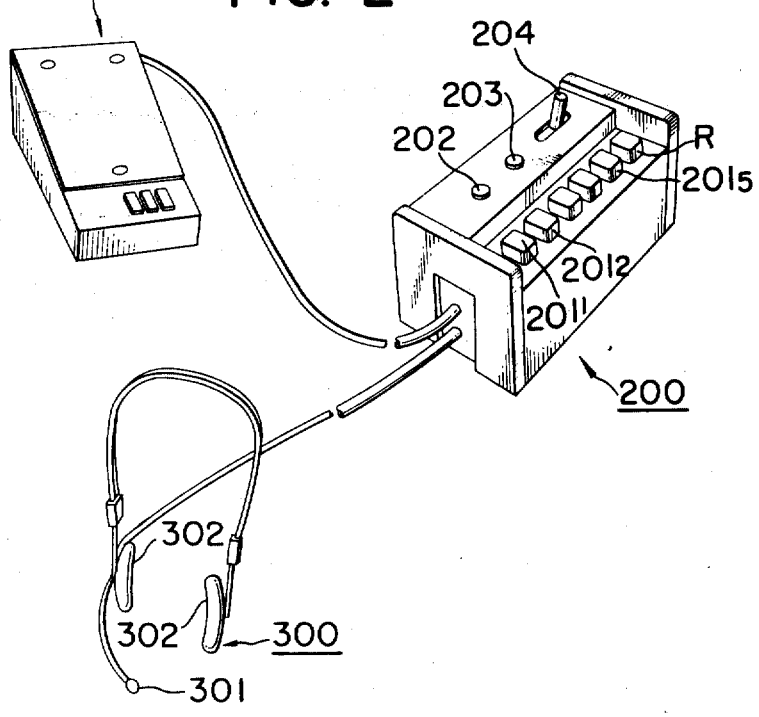
FIG. 2 is a perspective view of a terminal student console and its peripheral or auxiliary equipment.

Next referring to FIG. 2, a student console generally designated by 200 comprises five answer-selection buttons $201_1$–$201_5$, a green indicating lamp 202 which is turned on if a student has chosen the correct answer, a red indicating lamp 203 which is turned on when a student chooses a wrong answer, and a call switch 204 for calling the central console 100. The intercommunication between a student and a teacher may be made through a headphone 300 having a receiver 302 and a microphone 301.

A sound reproduction device 400 may be connected to the student console 200 so that the instruction and question may be given to a student. The sound reproduction device 400 may be a "Synchrofac" type in which a magnetic head revolves along a spiral path toward the center of a magnetic sheet upon one surface of which are recorded the instructions and questions and upon the other surface of which are printed the same instructions and questions.

Figure 3:
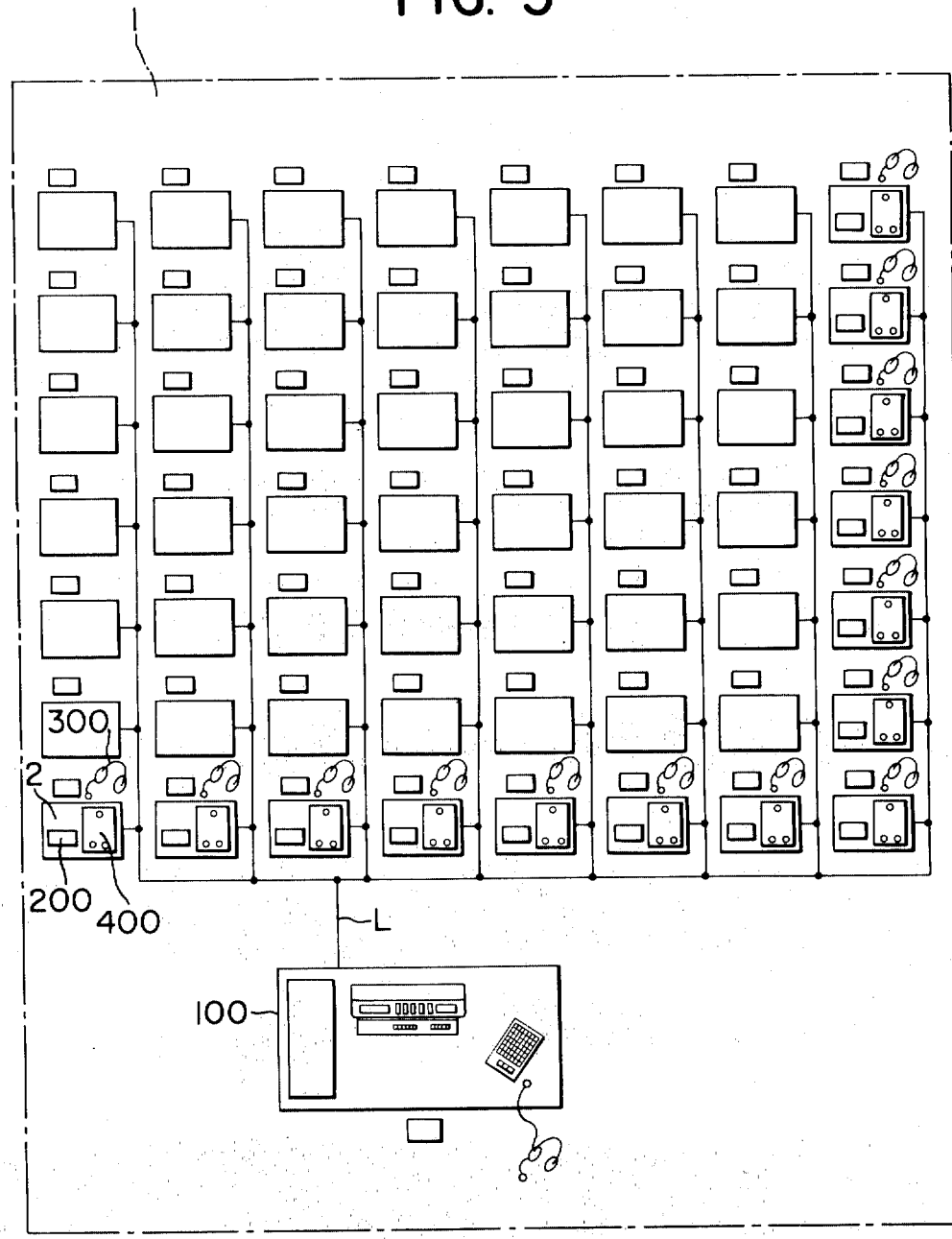
FIG. 3 is a view illustrating the arrangement of the central and student consoles when the group response analyzing system of the present invention is applied to a group teaching system.

Referring to FIG. 3, the central console 100 is mounted upon a teacher's table in a room 1 whereas the student consoles 200, the headphones 300 and the sound reproduction device 400 are mounted upon the students' desks designated by 2. In the instant embodiment, 56 student consoles 200 are installed and connected to the central console 100 through an intercommunication channel generally designated by L.

GENERAL MODE OF OPERATION

Figure 4:
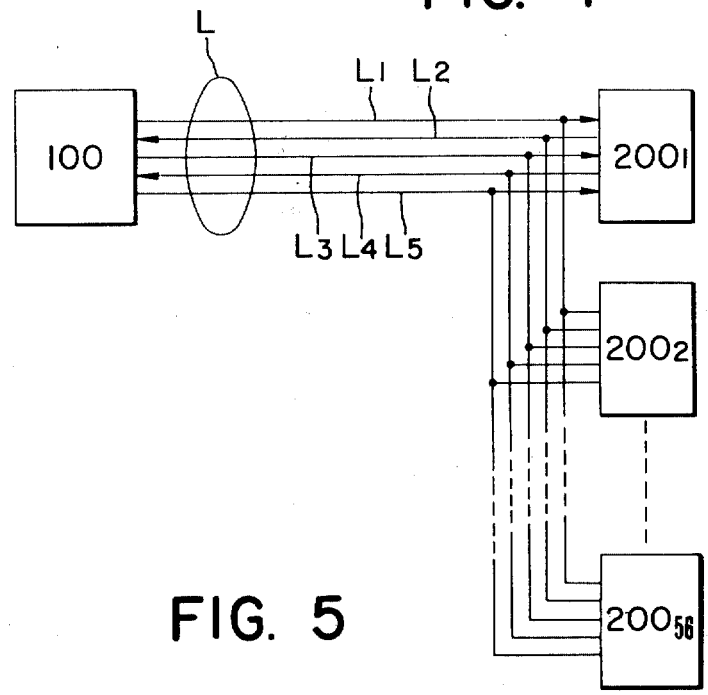
FIG. 4 is a block diagram illustrating the intercommunication between the central and student consoles.

As shown in FIG. 4, the central console 100 and the student consoles $200_1$–$200_{56}$ are interconnected through the intercommunication channel L comprising a scanning line $l_1$, an answer line $l_2$, a call line $l_3$, a communication line $l_4$ and a power line $l_5$ all of which may be enclosed in one cable.

Next referring to FIG. 5, the time-division response-console scanning system will be described. An eight-digit X ring counter 118 steps in response to the input clock pulse Pi, and a seven-digit Y ring counter 119 steps in response to the carry pulse Pc from the X ring counter 118. The X and Y ring counters 118 and 119 are generally disposed in the central console 100, and X-output lines $l_{x0}$–$l_{x7}$ and Y-output lines $l_{y0}$–$l_{y6}$ are extended from respective stages of the X and Y ring counters 118 and 119 respectively. These X- and Y-output lines $l_x$ and $l_y$ constitutes the scanning line $l_1$, and each pair of X- and Y-output lines $l_x$ and $l_y$ are connected to each student console 200. For example a pair of output lines $l_{x0}$ and $l_{y0}$ are connected to the student console $200_1$; a pair of output lines $l_{x1}$ and $l_{y0}$, to the student console $200_2$, and so on. Thus 56 student consoles 200 may be selected or scanned by the X and Y output signals transmitted through the X- and Y-output lines $l_x$ and $l_y$. For example when the output signals from the first stages of the X and Y ring counters 118 and 119 are at high level, the student console $200_1$ is selected through the X and Y-output lines $l_{x0}$ and $l_{y0}$. When the high-level output signal is derived from the second stage in the X counter 118, the output signal from the first stage in the Y counter 119 is still at high level so that the student console $200_2$ is selected through the X- and Y-output lines $l_{x1}$ and $l_{y0}$. In response to the ninth clock pulse Pi, the X counter 118 is reset and the carry pulse Pc is fed into Y counter 119 so that the high-level output signal appears on the Y-output line $l_{y1}$. As a result the student console $200_9$ is selected. In like manner, in response to the 55th clock pulse Pi the high-level output signals appear on the X-output line $l_{x7}$ and on the Y-output line $l_{y6}$ so that the student console $200_{56}$ is selected. In response to the 57th clock pulse Pi, both X and Y counters 118 and 119 are reset, and the same operation is cycled.

INTERCOMMUNICATION CHANNEL L, FIG. 4

The exchange of various signals between the central and student consoles 100 and 200 are all made in synchronism with the above described time-division scanning through the intercommunication channel L.

Referring back to FIG. 4, the answer line $l_2$ is used to transmit the correct-answer signals from the student central consoles 200 to the central console 100. The answer line $l_2$ consists of four transmission lines, and three transmission lines are used to transmit the answer or response signal whereas the remaining one transmission line is used to transmit the call signal from the student console 200 to the central console 100 as will be described in more detail hereinafter with reference to FIG. 15.

The call line $l_3$ is used to transmit the call signal from the central console 100 to the student console or consoles 200 in order to permit the teacher to call only one or more than two specific students or all students, and comprises two transmission lines for energizing and deenergizing the communication line $l_4$ as will be described in more detail hereinafter with reference to FIG. 17.

When the call signal is transmitted through the call line $l_3$ in response to the scanning signals transmitted through the scanning line $l_1$, the teacher may communicate with all students through the communication line $l_4$ so that she may ask them a question. The answer or response signals from the student consoles 200 are transmitted to the central console 100 through the answer line $l_2$ in synchronism with the scanning signals. The answer signals are analyzed or processed and the results of the analysis or processing are displayed and/or stored by the paper tape puncher 115 in the central console 100.

The detection whether the student selected the correct or wrong answer may be made by transmitting the scanning signal through the line $l_1$ only to the console 200 of the student who selected the correct answer when this student console 200 is selected, but not to the console of the student who have chosen the wrong answers. Therefore the "correct" indicating lamps of the consoles 200 of the students who have chosen the correct answer are turned on whereas the "wrong" red indicating lamps 203 are turned on when the students choose the wrong answers.

The above and other functions of the group response analyzer system in accordance with the present invention will be described in more detail hereinafter.

CENTRAL CONSOLE

Figure 5:
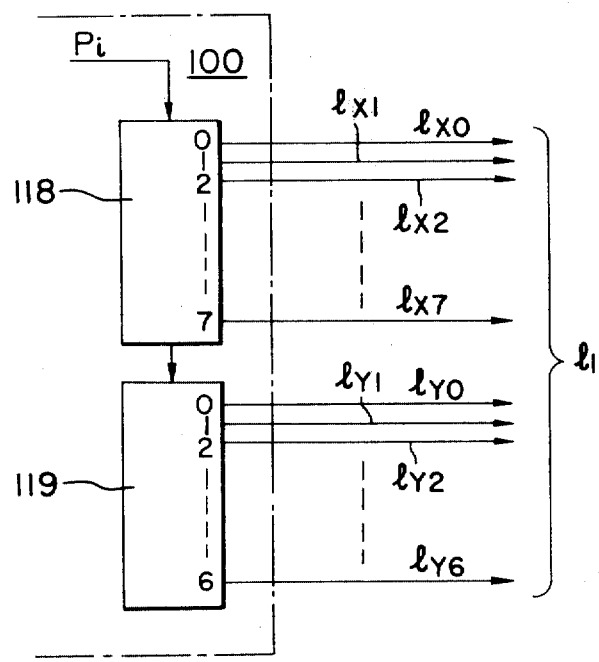
FIG. 5 is a block diagram used for the explanation of the time-division scanning system used in the present invention.
Figure 6:
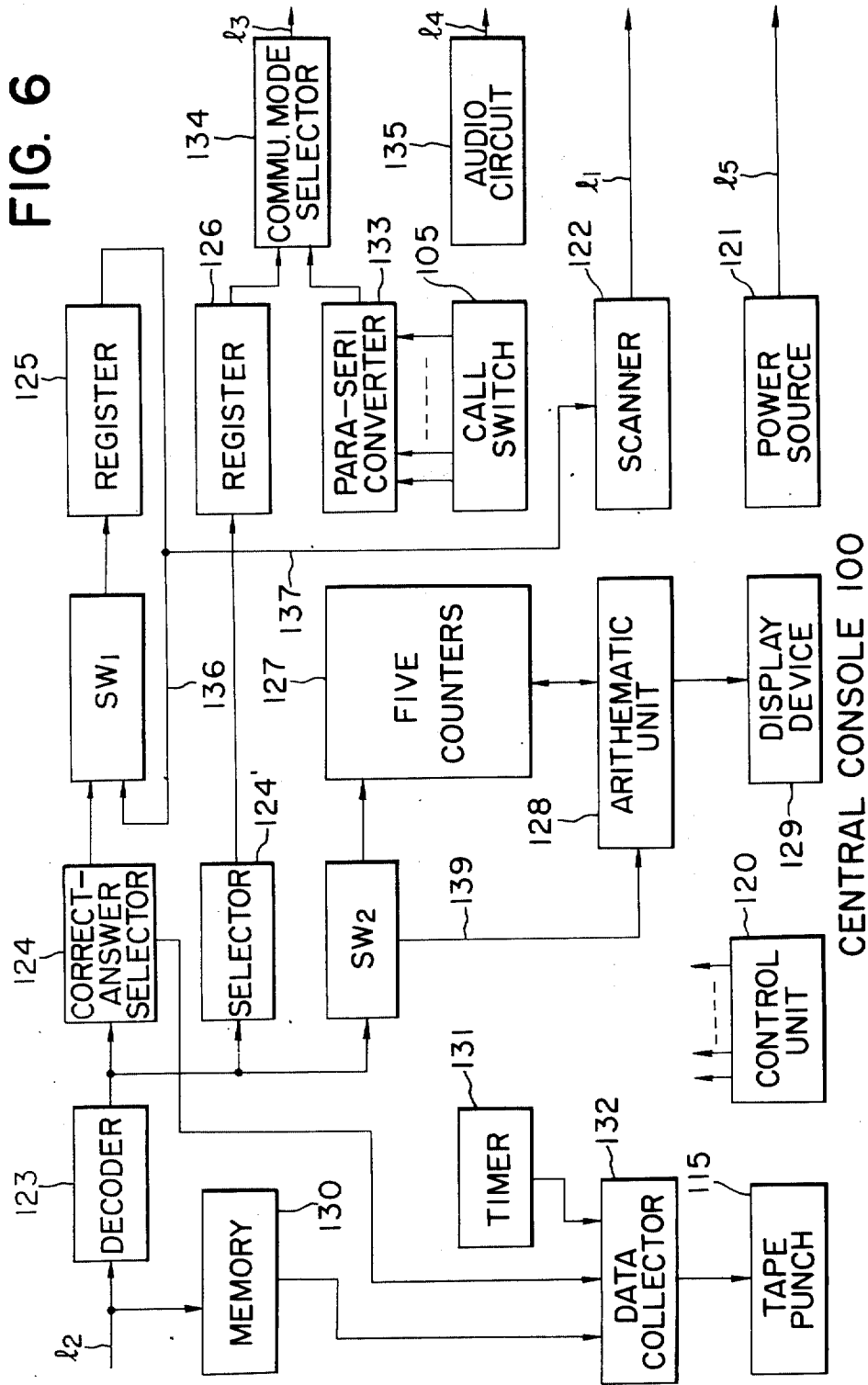
FIG. 6 is a block diagram of the central console.

The central console 100 shown in block diagram in FIG. 6 generally comprises a control unit 120 which generates various signals such as clock signals, timing signals and the like used to control various circuits in the central console 100, and a power source 121 which supplies the power not only to the various circuits in the central console but also to the student consoles 200. In response to the clock pulses from the control unit 120, a scanner 122 is energized so that the student consoles 200 are sequentially scanned or selected. This time-division scanning operation is the most fundamental operation of the system in accordance with the present invention. The mode of operation of the scanner 122 has been already described in detail with reference to FIG. 5.

Reference numeral 134 denotes a communication mode selector; and 135, an audio circuit. The three mode selection switches 104, 104' and 104'' shown in FIG. 1 are included in the selector 134. In the all-call mode, the call signal is transmitted on the call line $l_3$ independently of the scanning timing of the scanner 122 so that all of the student consoles 200 are called through a communication line $l_4$ as will be described in more detail hereinafter. Then the teacher may ask all students a question, and set a correct answer into a correct-answer selector 124 which includes the correct-answer setting buttons 102 shown in FIG. 1. In the instant embodiment the correct answer or choice is assumed to be No. 2, which is set into the selector 124. The answer or response signals from the student consoles 200 are sequentially transmitted on the answer line $l_2$ to a decoder 123 in response to the scanning signals from the scanner 122 as will be described in more detail hereinafter. The decoder 123 decodes the answer signals and gives the output signals to a correct response or answer selector 124. The correct answer signal is selected by the selector 124 and is delivered into a correct-response or -answer shift register 127 through a selection switch $SW_1$. The shift register 125 has a number of stages or bit positions corresponding to the number of student consoles, and each stage or bit position has one-to-one correspondence to each student console 200. For example the least significant stage or bit position in the shift register 125 corresponds to the student console $200_1$ whereas the most significant stage or bit position, to the student console $200_{56}$. Each stage or bit position in the shift register 125 is connected to an indicating lamp. A response or answer shift register 126 to be described hereinafter is similar in construction to the correct-response shift register 125. The indicating lamps of the seat display panel shown in FIG. 1 are connected to the shift registers 125 and 126. The shifts in the registers 125 and 126 are made in response to the scanning signals from the scanner 122 so that the flip-flops or the like in the stages corresponding to the consoles of the students who selected the correct answer No. 2 are sequentially set into the stage 1 and the corresponding indicating lamps in the display panel 109 are turned on. Thus the teacher may immediately see who gave the correct answer and who gave the wrong answers. The content in the shift register 126 may be circulated through the selection switch $SW_1$ and a circulation loop 136 until a next question is given.

In order that the students may see if they selected the correct answer, the ordinary scanning signals are transmitted on the scanning line $l_1$ to the student consoles of the students who gave the correct answer, but no scanning signal is transmitted to the consoles of the students who selected the wrong answers. More particularly after the responses or answers are received from all student consoles 200, a selection switch $SW_1$ is actuated to deliver the content in the shift register 125 to the scanner 122 through a line 137 so that some of the output signals of the scanner 122 may be suppressed. For this purpose the scanner 122 shown in FIG. 5 may be changed in design as shown in FIG. 7.

Figure 7:
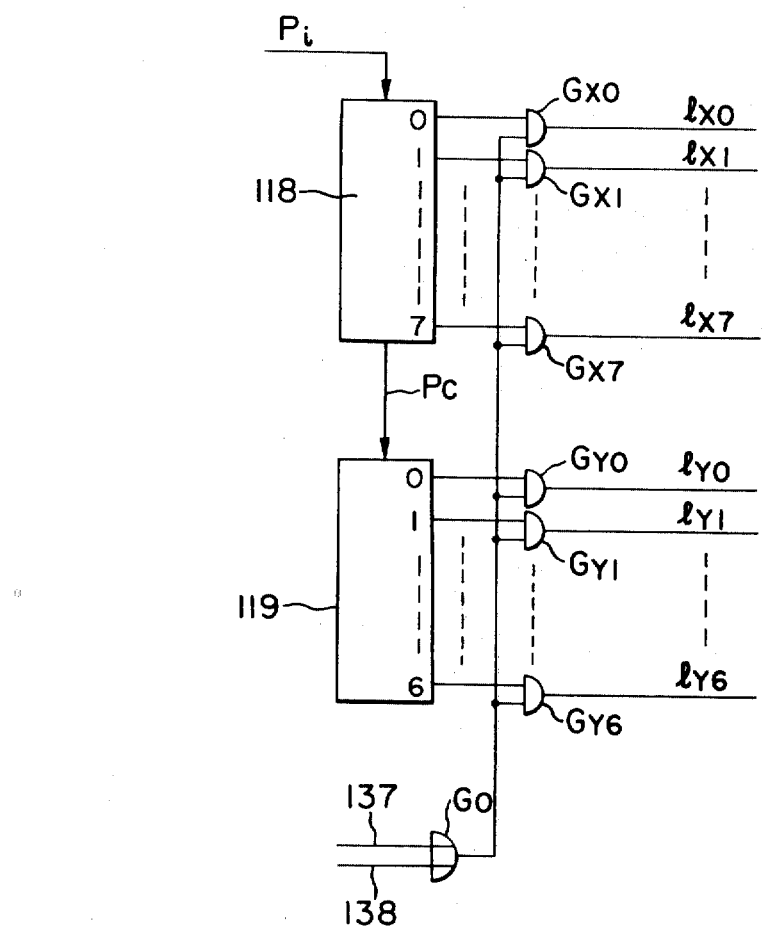
FIG. 7 is a block diagram used for the explanation of the function of the central console for detecting the terminal student consoles of the students who selected the correct and wrong answers respectively.

Referring to FIG. 7, the high-level signal normally applied on a line 138 is applied through an OR gate $G_O$ to AND gates $G_{x0}$–$G_{y6}$ inserted in the X and Y scanning lines $l_{x0}$ - - - $l_{x7}$ and $l_{y0}$ - - - $l_{y6}$, so that the scanning operation described with reference to FIG. 5 is carried out. When it is desired to transmit the correct signal to the student consoles 200, the high-level signal on the line 138 changes to the low-level signal and the output signals of the shift register 125 (See FIG. 6) are delivered on the line 137 to the AND gates $G_x$ and $G_y$ through OR gate $G_O$. The shifts in the shift register 125 are made in synchronism with the scanning by the scanner 122 so that the high-level signals appear on a pair of X and Y output lines $l_x$ and $l_y$ connected to the console of a student who gave the correct answer, but the low-level signals appear on the pair of X and Y output lines connected to the console of a student who gave the wrong answer. Thus when the high-level scanning signal is received by the student console, the right green indicating lamp is turned on, but when the scanning signal is not received, the wrong red lamp is turned on as will be described in more detail whereinafter.

In some cases the teacher desires to communicate with the students who gave the specific wrong answer, for example No. 3. Referring back to FIG. 6, the teacher selects "No. 3" by the selector 124' which is similar in construction and function to the correct response selector 124 and which has the five buttons 103 shown in FIG. 1. The selector 124' must establish the call mode so that the teacher may communicate with the students who gave the answer No. 3. The output signals of the decoder 123 are also applied to the selector 124' so that the output signals corresponding to the answer No. 3 are sequentially delivered into a response register 126 which is similar in construction and function to the correct response shift register 125 described above. The stages in the shift register 126 corresponding to the consoles of the students who gave the answer No. 3 are set to 1. The content in the register 126 is delivered through the selector 134 onto the line $l_3$ in synchronism with the scanning signals from the scanner 122 so that the teacher may communicate with the students who gave the wrong answer No. 3 as will be described in more detail hereinafter. The teacher may explain why they selected the wrong answer No. 3, and gives them the correct answer No. 2 if necessary. In like manner, the teacher may talk with the students who gave the wrong answers No. 4 and No. 5, respectively. When the teacher talks to only one student, the call switch 105 is turned on and the individual call mode is selected by the selector 134. The output signals from the call switch 105 are delivered into a parallel-series converter 133 in synchronism with the scanning signals and converted into the series output signal which is transmitted on the line $l_3$ in a manner similar to that described above with reference to the response register 126.

So far it has been assumed that all students sit at all of the student consoles $200_1$–$200_{56}$, but in practice some of the student consoles are not used. In this case the students present may be confirmed by the manner to be described hereinafter. The "call-to-all-student mode" is selected by the communication mode selector 134, and for example No. 1 is set into the correct response selector 124. Then the teacher asks the students to press No. 1 button. The response signals from the student consoles 200 are sequentially delivered into the register 125 in the manner described above so that the binary signal 1 s are set in the stages in the register 125 corresponding to the consoles 200 of the students who are present, but the binary signal 0 appear in the stage corresponding to the consoles of the students who are absent. Thus the students who are present are indicated by the seat display panel 109 shown in FIG. 1.

Still referring to FIG. 6, the central console 100 further comprises a group of five counters 127 each for counting the number of students who selected a specific answer, and an arithmetic unit 128. Each counter in the counter group 127 is selected by the selector 124 or 124', and counts the number of students who selected a specific answer in response to the output signals of the decoder 123 applied to the counter 127 through the selection switch $SW_2$. When the output signals of the decoder 123 represent the consoles of the students who are present, they are delivered to the arithmetic unit 128 through the selection switch $SW_2$ and the line 139 and counted by a counter in the unit 128.

The output signals of the counters 127 are delivered into the arithmetic unit 128 so that the response ratios which are the percentage of the students who selected respective answers may be calculated. The response ratio for a specific answer is a ratio of the students who selected the correct answer, to be referred to as "the correct response ratio" hereinafter in this specification, and may be used to compare with other four wrong response ratios.

The number of students who respond to or answer the question generally increases as time elapses. Therefore the response ratio, that is the number of students who answered is calculated as a function of time everytime when the scanner 122 makes one scanning operation, and is displayed by a display device 129 including the analog and digital meters 110 and 111 and the display panel 112 shown in FIG. 1. The response or answer signals delivered from the student consoles 200 through the line $l_2$ are also delivered into a memory 130 for storing the response conditions and fed the tape punch 115 punched through the data collector 132 together with the correct response or answer signals and time data delivered from the correct response or answer selector 124 and timer. The data recorded on the punched tape may be fed into an electronic computer for data processing. Furthermore, the numbers of the students who are present and answered or selected respective answers may be directly displayed.

The central console 100 shown in FIG. 6 is only one example of the present invention, and it is understood that various modifications and variations may be effected. For example, instead of the paper tape puncher 115, a magnetic recording device may be used, and the puncher 115 and some of the components of the display device 129 may be eliminated so that the central console may be made simple in construction. It is of course understood that when the magnetic reproducing devices 400 are provided for the student consoles, it is not required for a teacher to ask questions.

Next the circuits, devices and the like shown in block diagram in FIG. 6 will be described in more detail hereinafter.

SELECTORS, 124 AND 124', FIG. 8

Figure 8:
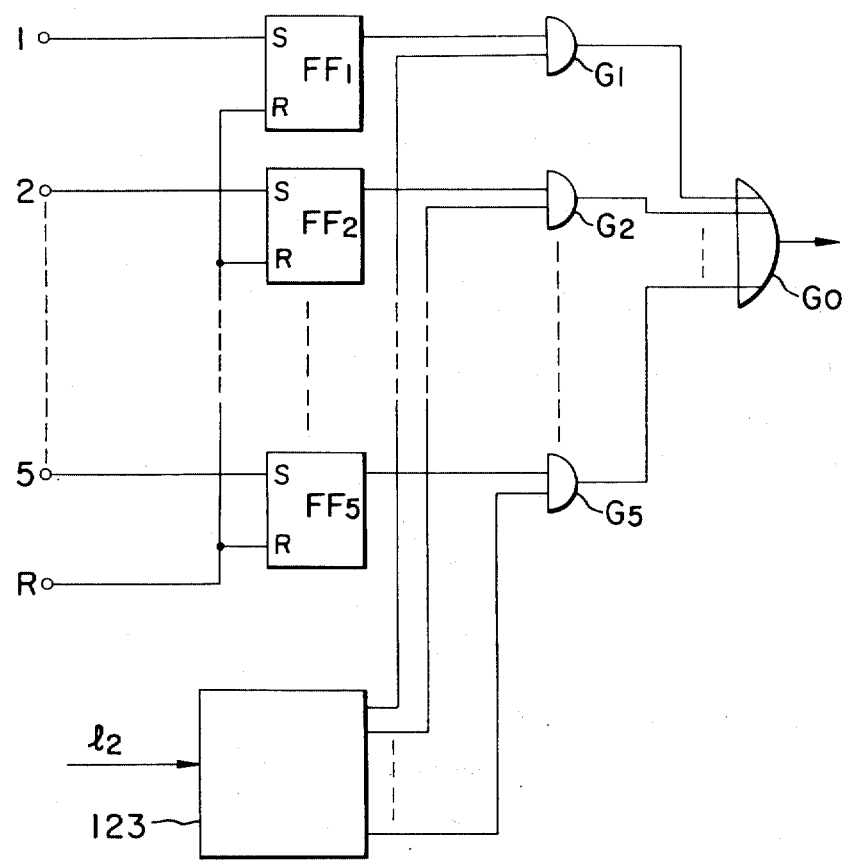
FIG. 8 is a block diagram of a selector in the central console.

Since the two selectors 124 and 124' are similar in construction, only one selector will be described with reference to FIG. 8.

The selector comprises five flip-flops $FF_1$-$FF_5$ for selecting the answers Nos. 1–5, AND gates $G_1$-$G_5$, and an OR gate $G_O$. When the response or answer selection button (not shown) is pressed for selecting for example the Answer No. 1, the flip-flop $FF_1$ is set so that only the output signals of the decoder 123 representing the answer No. 1 may be delivered through the AND gate $G_1$ and the OR gate $G_O$. It should be remembered that the response or answer signals from the student consoles 200 are transmitted through the line $l_2$ to the decoder 123 in synchronism with the scanning signals from the scanner 122 (See FIG. 6). Therefore the pulses delivered from the OR gate $G_O$ represent the consoles 200 of the students who selected the answer No. 1. In like manner, the selector gives the output pulses representing the consoles of the students who selected the answers No. 2 – No. 5. The output pulses are delivered into the shift registers 127 and 128 as described hereinbefore with reference to FIG. 6.

ARITHMETIC UNIT 128, FIG. 9

When the number of the students who are present is A and the number of the students who selected a specific answer is B, the response ratio S is given by $$S = (B/A) \times 100 \, (\%) \tag{1}$$

Figure 9:
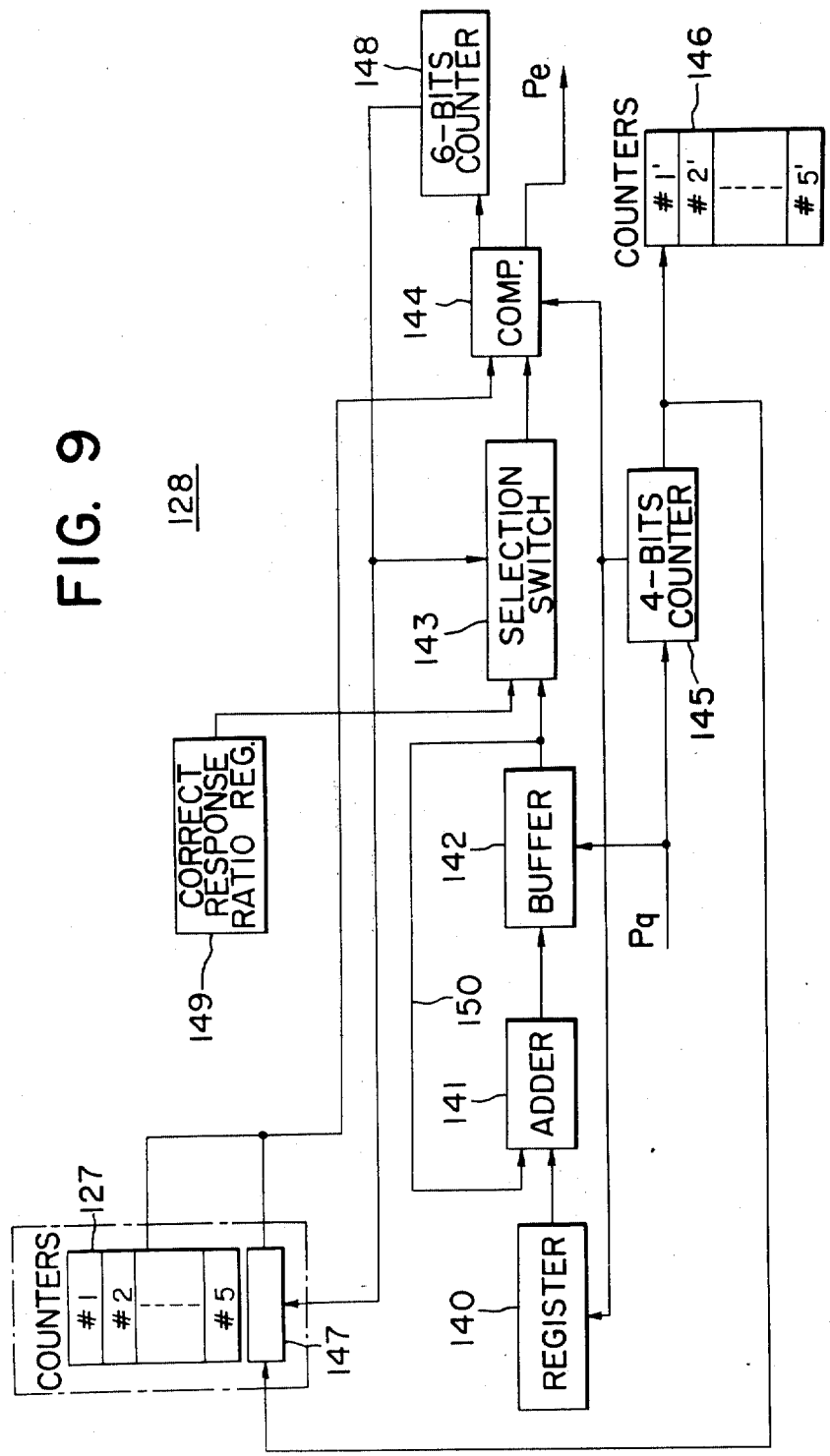
FIG. 9 is a block diagram of an arithmetic unit in the central console.

Referring to FIG. 9, the arithmetic unit 128 generally comprises a register 140 which holds the number of students who are present; a parallel adder 141 having four digit stages, each digit consisting of four bits; a four-digit buffer register 142; a selection switch 143, a comparator 144, a four-stage counter or 145; a group of response-ratio counters 146; a correct-response-ratio counter 147; a six-stage counter 148; and a correct-response ratio register 149.

The addition of the number A is repeated by n times by the parallel adder 141 and compared with the number B × 100 until the following relation is established:

$$A \times n \geq B \times 100$$

where $n$ = number of additions. It is readily seen that the response ratio S may be obtained from the number $n$. The number B is stored in each of the counters 127. The output signal of the parallel adder 141 is temporarily stored in the four-stage buffer register 142. In response to the output signal of the counter 145, the contents in the register 140 are selected one digit by one digit and the comparator 144 is actuated. The clock pulses Pq are applied to the counter 145, and in response to the output signal of the counter 145 the content in the register 142 is shifted to the right. The output signal of the counter 145 is also applied to the counter group 146 consisting of five counters for respective answers No. 1 – No. 5. The output signal of the counter 145 is also applied to the correct-response ratio counter 147 which is disposed as a sixth counter in the counter group 127. In response to the output signal from the counter 148 the counters in the counter groups 127 and 146 are selected.

The arithmetic unit shown in FIG. 9 may be used not only for obtaining the response ratios but also for comparing them with a predetermined correct-response ratio so that when the correct-response ratio reaches a predetermined ratio, the next question will be asked. A reference correct-response ratio may be set in the register 149.

It is now assumed that the selection switch 143 select the response-ratio operation mode and the content of the buffer register 142 be 0 whereas the counter 148 be in the initial stage 1 so that the counters 1 and 1′ for the answer No. 1 are selected from the counter groups 127 and 146 respectively. Therefore the content in the counter No. 1, that is the number B of students who selected the answer No. 1 is placed in the most significant digit and the next significant digit in the comparator 144. This means, the arithmetic operation B × 100 is executed and held in the comparator 144.

In response to the clock pulse Pq, the content in the buffer register 142 is shifted right and the output signal of the buffer register 142 is applied as one input to the parallel adder 141 whereas in response to the output signal of the counter 145 the output of the register 140 is applied as the other input to the parallel adder 141. Thus in response to the fourth clock pulses Pq, the result of the first addition, that the number A itself is stored in the buffer register 142, and the output signal is given from the last stage of the counter 145 so that the content in the register 142 is compared with that in the counter No. 1. In like manner, the results of additions stored in the register 142 are compared with the content in the counter No. 1 for each four clock pulses Pq. The counter 145 gives the carry signal for each four clock pulses Pq to the decimal counter No. 1′ in the counter group 146. That is, the counter No. 1′ holds the number $n$ of additions A. When $n \times A = 100 \times B$, the comparator 144 gives the output signal to the counter 148 so that the counters No. 2 and No. 2′ in the counter groups 127 and 146 are selected. In like manner, the response ratio for the answer No. 2 is calculated. The response ratios thus obtained are stored in the counters in the group 146, and the correct-response ratio is especially stored in the counter 147.

When the counter 148 counts six output pluses from the comparator 144, the switch 143 now selects the correct-response counter 147 so that the correct-response ratio may be compared with the content in the reference correct-response ratio register 149. When the correct-response ratio is in excess of the reference ratio, the comparator gives the stop signal $P_e$ to stop the operation of the arithmetic unit 128 so that the next question may be asked. However, it is understood that the arithmetic operation may be stopped a predetermined time after it is started in response to the output signal of a timer or the operation may be stopped manually.

The various arithmetic operations described above are carried out in response to the scanning signals from the scanner 122 (See FIG. 6) so that the response ratios stored in the counters in the group 146 and the correct-response ratio stored in the counter 147 vary from time to time.

GRAPHIC DISPLAY PANEL 112, FIG. 10

Figure 10:
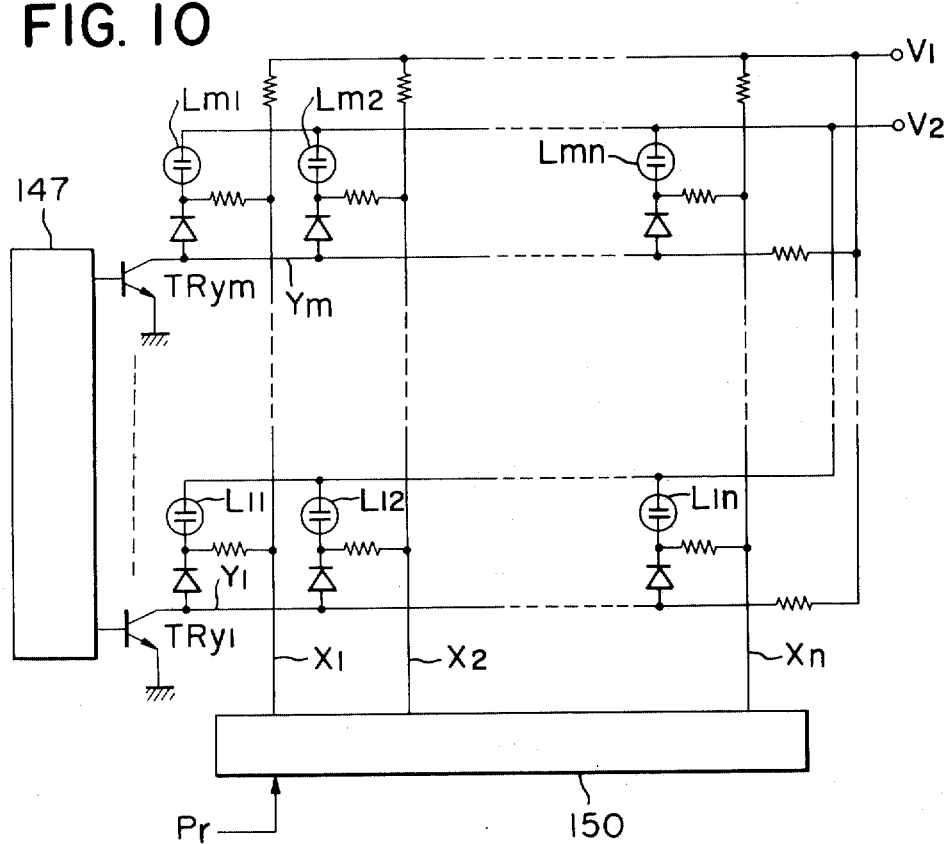
FIG. 10 is a diagram illustrating a display device in the central console.

The change in the response ratio with respect to time may be displayed by the graphic display device 112 shown in FIG. 10. The scale of the X or time axis is determined by the time axis scaling counter 150, and the content in the correct-response ratio counter 147 is plotted along the ordinate or Y-axis.

As shown in FIG. 10, the X drive lines $X_1$–$X_n$ are extended from the stages of a counter 150, and the Y drive lines $Y_1$–$Y_m$ are extended through transistors $TR_{y1}$–$TR_{ym}$ from the stages of the counter 147. Indicating lamps $L_{11}$–$L_{nm}$ are disposed at the points of intersection between the X and Y drive lines and the voltages $V_1$ and $V_2$ are applied to the terminals of the indicating lamps $L_{11}$–$L_{nm}$ through resistors.

The content in the correct-response counter 147 generally increases as time elapses and converges toward a certain value after a predetermined time. The low-level signal appears on the Y drive line of the stage which corresponds to the content of the counter 147 whereas in response to the clock pulses Pr the time axis counter 150 steps so that the low-level signals appear on the X drive lines sequentially. As a result the indicating lamps L at the points of intersection of the X and Y drive lines with the low-level signals are turned on sequentially. Once the indicating lamps 11 are turned on, they may remains turned on even after the drive signals on the X and Y drive lines have returned to the high level. The above described graphic display panel is of a conventional type for example disclosed in US patent application Ser. No. 256373, filed May 24, 1972 by TAKASHI INOUE now U.S. Pat. No. 3,757,160. It is seen that the segment connecting the adjacent turned-on indicating lamps L indicates the rate of change in response ratio with respect to time.

The time required for a student to select an answer changes depending upon the level of the question, and the number of the answer signals received by the central console 100 suddenly increases a certain time after the question is asked. Therefore when the frequency of the clock pulses Pr is constant and the response from the student is delayed, the rate of change in response ratio with respect to time will not be sufficiently clearly displayed. To solve this problem, the capacity of the time axis counter 150 and the number of indicating lamps L must be remarkably increased. To overcome this defect, according to the present invention a time $\tau$ required for the response ratio to reach a certain ratio, for example, 5% is measured and the frequency of the clock pulses Pr, that is the scale of the time axis may be determined depending upon the measured time as will be described in more detail hereinafter with reference to FIG. 11.

Figure 11:
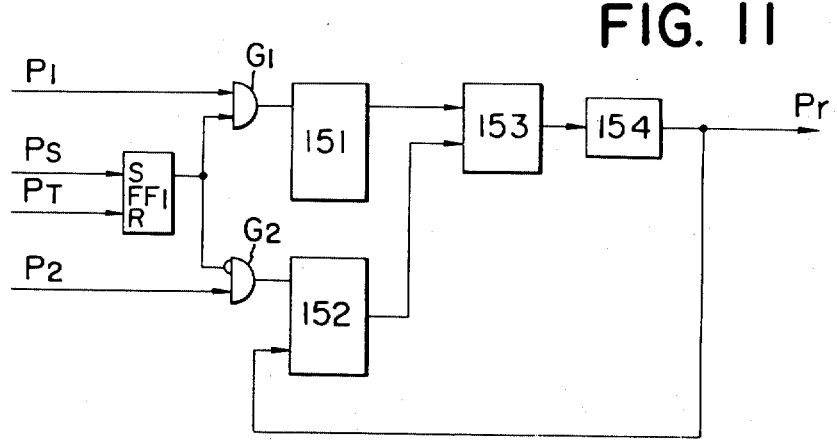
FIG. 11 is a block diagram of a time-scale signal generator used in the display device shown in FIG. 10.

A reference time measuring circuit shown in FIG. 11 comprises a time counter 151 for counting a time $\tau$ until the response ratio becomes 5%, a counter 152 for determining the frequency of the clock pulses depending upon the measured time $\tau$, an AND gate 153 to which are applied the output signals of the counters 151 and 152, and a monostable multivibrator 154. The periods $T_1$ and $T_2$ of the first and second clock pulses $P_1$ and $P_2$ are determined to satisfy the following relation:

$$T_1 > T_2.$$

In the instant embodiment, $T_1 = 5\ T_2$.

In response to the start signal Ps generated when a question is asked, the flip-flop $FF_1$ is set so that the first clock pulse $P_1$ is applied to the counter 151 through an AND gate $G_1$. The flip-flop $FF_1$ is reset in response to the stop signal Pt generated when the response ratio rises to 5% so that the counter 151 stops counting. The stop signal Pt may be generated by a coincidence circuit which gives the output signal When the content in the response ratio counter 147 (See FIG. 9) reaches 5%. The content in the counter 151 when it has stopped counting represents the time $\tau$ required for the response ratio to rises 5%. In response to the rest of the flip-flop $FF_1$, the second clock pulses $P_2$ are passed through the AND gate $G_2$ and counted by the counter 152. When the content in the counter 152 becomes equal to that in the counter 151, the coincidence circuit 154 gives the output signal to the monostable multivibrator 154 so that the latter may give the pulse Pr with a constant pulse width. In response to the pulse Pr, the counter 152 is reset, and in like manner the operation is cycled. The pulses Pr are applied to the counter 150 shown in FIG. 10 and determines the scale of the time axis. It is seen that the frequency of the clock pulses Pr is dependent upon the content in the counter 151, that is the time $\tau$. Moreover the indicating lamps may be disposed at the points $t_1, t_2, t_3, \ldots$ along the time axis corresponding to the time $\tau, 2\tau, 3\tau, \ldots$ so that they may be sequentially turned on for each five clock pulses Pr.

It is understood that instead of the graphic display panel of the type described with reference to FIGS. 10 and 11, any suitable display device such as a cathode-ray tube, plasma display device or the like may be used.

SHIFT REGISTERS, 125 AND 126, FIG. 12

Figure 12:
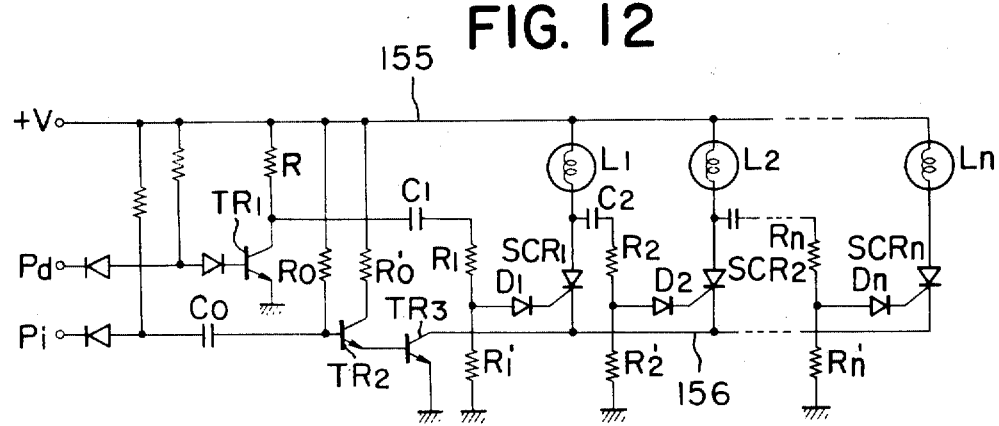
FIG. 12 is a circuit diagram of a shift register used in the central console.

In the central console 100 are incorporated the correct-response shift register 127 and the response register 128 of the type shown in FIG. 12. The anodes of silicon-controlled rectifiers $SCR_1$–$SCR_{54}$ are connected through indicating lamps $L_1$–$L_n$ and a common bus line 155 to the DC power source $+V$, whereas the cathodes are grounded through a common line 156 and a transistor $TR_3$. In response to the clock pulses Pi which are also delivered to the scanner 122 (See FIG. 5), the input pulse train Pd is applied to the shift register. A transistor $TR_2$ is triggered through a time constant circuit comprising a resistor $R_0$ and a capacitor $C_0$ and having a time constant smaller than that of a time constant circuit which comprises resistors R, $R_1$, $R'_1$ and a capacitor $C_1$ and triggers $SCR_1$. In like manner the time constant of the time constant circuit in the first stage is made smaller than that of the time constant circuit in the second stage, and the same is true for all of the adjacent stages in the shift register.

In response to the clock pulse Pi, the transistors $TR_2$ and $TR_3$ are turned off so that SCRs which have been ON are turned off. Thereafter the transistors $TR_2$ and $TR_3$ are instantaneously turned on so that when $SCR_{i-1}$ in the lower stage is ON, $SCR_i$ in the next stage is ON whereas when $SCR_{i-1}$ is OFF, $SCR_i$ is also OFF. More particularly when $SCR_1$ is ON and the transistor $TR_3$ is turned on, the capacitor $C_2$ is charged and the positive voltage pulse is applied to the gate of $SCR_2$ so that the latter is turned on. On the other hand when $SCR_1$ is OFF, no pulse is applied to the gate of $SCR_2$ because the capacitor $C_2$ has been already charged so that $SCR_2$ remains turned off. The ON-OFF operation of $SCR_1$ in response to the input pulse Pd applied in synchronism with the clock pulse Pi is similar to that described above. In the shift register shown in FIG. 12, in response to the ON-OFF operation of the transistor $TR_3$ which in turn is made in response to the clock pulse Pi, the content in each stage shifts to the right.

The shift register shown in FIG. 12 is less in number of circuit elements as compared with the prior art flip-flop registers and is inexpensive to manufacture. The conventional flip-flop shift registers may be also used in the present invention. When it is desired to form a ring counter, the output signal of the last stage is fed back to the first stage, and the first input pulse Pd is maintained at high level whereas the following pulses are maintained at low level.

POWER SOURCE, 121, FIG. 13

The power source 121 (See FIG. 6) generally comprises a smoothing circuit for smoothing a commercial AC input voltage $e_i$ and a stabilizing circuit 158 for giving the constant DC output voltage regardless of the load variation.

In the stabilizing circuit when the load is increased the potential at the point c lowers so des the potential at the point d so that the base current of the transistor $TR_1$ is decreased. As a result the internal resistance of the transistor $TR_1$ is increased so that the collector current is decreased. That is, the current $i_1$ flowing through the resistor $R_1$ and $R_2$ is decreased so that the potential at the point b is increased. Then the transistors $TR_2$ and $TR_3$ have the same voltage amplification degree almost equal to unity, the potential at the point c is increased by the same amount with the potential rise at the point b. Thus the voltage drop at the point c due to the load variation may be compensated.

When the output voltage variation is $\Delta E_o$ when the stabilizing circuit 158, which is an amplifier with the negative feedback, is not used, the voltage variation in the stabilizing circuit 158 is given by $$\Delta E'_o = \frac{r_{o1}}{\beta(R_1 + R_2)} \cdot \Delta E_o$$

where
- $r_{iel}$ = base-emitter resistance of transistor $TR_1$, and
- $\beta = h_{FE}$ of transistor $TR_1$.

In practice $r_{iel} = R_1 + R_2$ and $\beta = 100$, so that the output voltage variation $\Delta E'_O$ may be suppressed to about one hundredth of the voltage variation $\Delta E_O$.

STUDENT CONSOLE, 200, FIG. 14

So far the central console 100 has been described in detail and next the student console 200 will be described in detail hereinafter.

As shown in FIG. 14, the student console 200 is interconnected with the central console 100 through the scanning line $l_1$, the response line $l_2$, the call line $l_3$, the communication line $l_4$ and the power supply line $l_5$. The student console 200 generally comprises a response circuit 205, a display circuit 206, and a communication circuit 207.

When the student console 200 is selected through the scanning line $l_1$ in the manner described hereinbefore, the binary coded signal representing one of the answers No. 1 – No. 5 selected by the student in response to the question is transmitted to the central console 100 through the response line $l_2$. The display circuit 206 functions, in response to the high-level or low-level signal on the scanning line $l_1$, to turn on the green lamp 202 or red lamp 203 (See FIG. 2). In response to the high-level or low-level signal transmitted through the call line $l_3$, the communication circuit 207 energizes or de-energizes the communication line $l_4$. The functions of the all circuits 205, 206 and 207 in the student console 200 are in synchronism with the scanning operation through the scanning lines $l_1$ in the manner described hereinbefore so that the student consoles 200 are interconnected with the central console 100 with a minimum number of interconnecting lines. The response, display and communication circuits 205, 206, and 207 will be described in more detail with reference to the student console $200_1$ connected to the central console 100 through the X and Y drive lines $l_{xo}$ and $l_{yo}$.

RESPONSE CIRCUIT 205, FIG. 15

Contacts $S_1$–$S_5$ are actuated by the response or answer buttons $201_1$–$201_5$ (See FIG. 2), and contacts $S'_3$ and $S'_5$ are interlocked with the contacts $S_3$ and $S_5$, respectively. Contact C which is closed by the switch 204 (See FIG. 2) is used to call the central console 100. The response or answer signal is formed by a combination of three output lines 1, 2 and 4. For example, when the No. 1 response button $201_1$ is depressed, the contact $S_1$ is closed so that the output line 1 may be selected. In like manner when the No. 2 response button $201_2$ is depressed, the output line 2 is selected. When No. 3 response button $201_3$ is depressed, the contacts $S_3$ and $S'_3$ are closed so that the output lines 1 and 2 are selected. When the No. 4 button $201_4$ is depressed the contact $S_4$ is closed to select the output line 4, and when No. 5 response button $201_5$ is depressed, the contacts $S_5$ and $S'_5$ are closed to select the output lines 2 and 4. When the contact C is closed, the output line O is selected to call the central console 100. The response line $l_2$ consisting of four output lines 1, 2, 4 and O is used in common with other student consoles $200_2$–$200_{56}$. The input terminals of the contacts $S_1$–$S_5$ and C are all connected to the voltage source +V through a common transistor TR.

When the student pressed the No. 3 response button $201_3$ so that the contacts $S_3$ and $S'_3$ are closed and when the high-level signals are transmitted to the student console $200_1$ through the scanning line $l_1$, the transistor TR is conducted so that the high-level signals are transmitted through the output lines 1 and 2 in the response line $l_2$ to the central console 100. In like manner other response and call signals may be transmitted to the central console 100 through the response line $l_2$.

DISPLAY CIRCUIT, 206, FIG. 16

Referring to FIG. 16, the correct or wrong lamps $L_1$ or $L_2$ which corresponds to the green or red lamp 202 or 203 shown in FIG. 2 are turned on depending upon whether the student selected the correct answer No. 2 or not. The lamp $L_1$ is turned on when SCR is conducted whereas the lamp $L_2$ is turned on when a transistor $TR_2$ is conducted. A transistor $TR_1$, resistors $R_1$ and $R_2$ and a capacitor C constitute a sort of a timer circuit which has a time constant slightly longer than the scanning frequency. Therefore the transistor $TR_1$ is turned on only in response to one scanning signal, and thereafter remains ON so that the potential at the point A is clamped to the earth potential to prevent the lamps $L_1$ and $L_2$ from being erroneously turned on.

The power is supplied from the power source +V only when the display circuit 216 is actuated. That is, the display circuit 216 is connected to the central console through a special power supply line which is energized by the central console 100. It is of course possible to connect the power source +V to the common power supply line extending from the central console to the student consoles. In this case, each student console must be provided with a switching circuit which may be actuated from the central console only when the display circuit is to be actuated.

After the response signals have been received, the central console 100 transmits the scanning signals depending upon the content in the correct-response register 127 (See FIG. 6) so that the high-level signals are transmitted on the X and Y drive lines connected to the console of the student who selected to the correct answer, but the low-level signals appear on the X and Y drive lines connected to the console of the student who selected a wrong answer. When the voltage +V is supplied to the display circuit 216 and when the high-level signals appear on the X and Y drive lines $l_{xo}$ and $l_{yo}$, SCR is conducted to turn on the correct lamp $L_1$, but the transistor $TR_2$ is turned off so that the wrong or red lamp $L_2$ is not turned on. On the other hand when the low-level signals appear on the X and Y drive lines $l_{xo}$ and $l_{yo}$, SCR is not conduced but the transistor $TR_2$ is conducted to turn on the wrong or red lamp $L_2$.

COMMUNICATION CIRCUIT 207, FIG. 17

The communication circuit 127 is connected through a pair of branched circuits $l'_4$-1 and $l''_4$-1 to the going and return circuits $l'_4$ and $l''_4$ in the common communication line $l_4$. Transistors $TR_1$ and $TR_2$, which constitute a sort of hold circuit, are turned on when the potential at the point A reaches a predetermined level and remains ON. To turn off the transistors $TR_1$ and $TR_2$, the potential at the point A must be lowered to the earth potential. When the transistors $TR_1$ and $TR_2$ are turned on, transistors $TR_3$ and $TR_4$ are turned off so that the branched circuits $l'_4$-1 and $l''_4$-1 are not used. The call line $l_3$ consisting of two lines $l'_3$ and $l''_3$ is connected to the communication circuit 207. Furthermore, the branched circuits $l'_4$-1 and $l''_4$-1 are connected through the amplifier 208 to the microphone 301 and receiver 302. When the communication selector 134 (See FIG. 6) of the central console 100 selects the "call-to-all-student mode", the high-level signal is transmitted through the line $l'_3$ independently of the scanning signals. In case of the "individual-response-call mode", in which only the students who selected a specific response or answer are called, or in case of the "individual-call mode" in which only one student is called, the high-level signal appears on the line $l'_3$ only when the high-level signals appear on the X and Y drive lines $l_{x0}$ and $l_{y0}$ simultaneously.

The low-level or 0 V signal appears on the line $l''_3$ which is normally maintained at high level for a short time before the scanning operation is started. The point A is clamped to the earth or O potential so that the transistors $TR_1$ and $TR_2$ are turned off whereas the transistors $TR_3$ and $TR_4$ are turned on. Therefore the communication circuits $l'_4$-1 and $l''_4$-1 are de-energized. Thereafter when the high-level signals appear on the lines $l'_3$ and $l''_3$, the potential at the point A is raised so that the transistors $TR_1$ and $TR_2$ are turned on whereas the transistors $TR_3$ and $TR_4$ are turned off. Therefore the communication circuits $l'_4$-1 and $l''_4$-1 are energized so that the communication between the teacher and the student may be established.

When the transistor $TR_2$ is turned off, a capacitor C is charged by the current flowing through a resistor R so that the transistors $TR_3$ and $TR_4$ are turned on after a predetermined time. When the transistor $TR_2$ is turned off, the capacitor C is discharged through a diode D and the transistor $TR_2$ so that the transistors $TR_3$ and $TR_4$ are instantaneously turned off. The time constant which is determined by the capacitor C and the resistor R is made slightly longer than the scanning frequency so that the transistors $TR_3$ and $TR_4$ may be prevented from turning on in response to the low-level signal appearing on the line $l''_3$. Thus the communication between the teacher and the student may not be interrupted.

Figure 18:
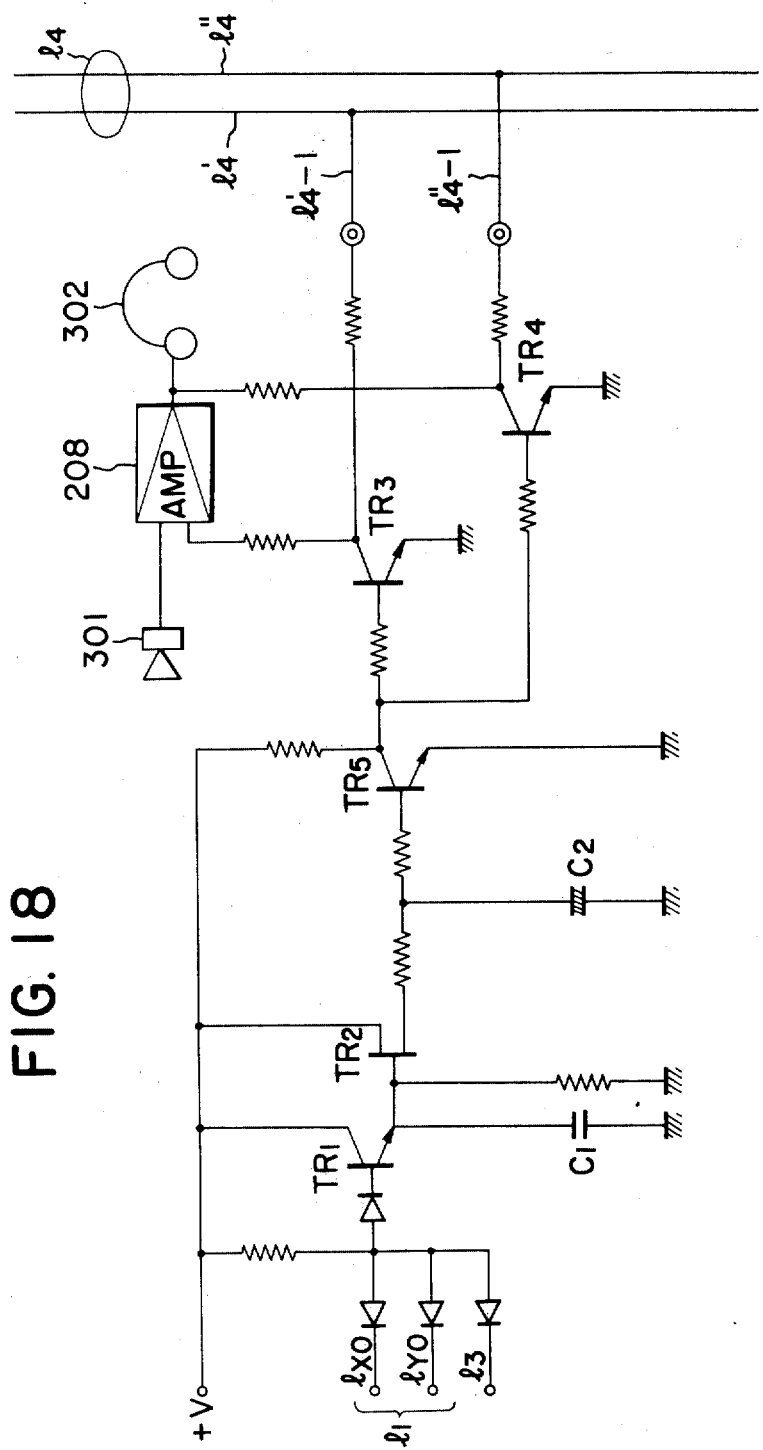
FIG. 18 is another embodiment of the communication circuit in the terminal student console.

The FIG. 18 is another embodiment of the communicating circuit 207. Please note that when this circuit is compared with that of the FIG. 17, the whole circuit of signal is composed of Field Effect Transistor (FET). When the voltages of both the scanning line $l_1$ and the call line $l_3$ become high-level, the condenser $C_1$ is charged instantly. If any one of the scanning line $l_1$ or the call line $l_3$ becomes low-level, the condenser $C_1$ is discharged gradually. Consequently single line is required for the call line $l_3$. When the condenser $C_1$ is charged, the transistors (FET) $TR_2$ and $TR_5$ are turned on and the consequence the transistors $TR_3$ and $TR_4$ are turned off, and the communication between student and teacher can be started as in the case of FIG. 17.

So far the group response analyzer system in accordance with the present invention has been described as being applied to the group teaching system, but it is understood that the system of the present invention may find a variety of applications. For example the group response analyzer in accordance with the present invention may be used to analyze the various responses to a particular question of the individuals in a group. It is to be understood that the preferred embodiment described above is presented for the purpose of explanation and illustration and is not intended to limits of the present invention and that various modifications and variations can be effected without departing the scope of the present invention.

What is claimed is:
1. A group response analyzing system comprising: a central console for a questioner, a plurality of terminal response consoles for questionees, an intercommunication channel selectively connecting said central console and terminal response consoles to transmit information therebetween, said channel including an answer line for transmitting, from the terminal response consoles to the central console, responses by the questionees to each of a succession of questions posed by the questioner and a call line for transmitting, from the central console to the terminal response consoles, calls or instructions from the questioner to the questionees, scanning means for successively selecting individual terminal response consoles to cause each selected terminal response console to supply to the central console a response to a question via said answer line of the intercommunication channel and to subsequently cause each selected terminal response console to receive from the central console calls or instructions from the central console via said call line of the interconnection channel, and means for processing the responses supplied to the central console, wherein the improvement comprises;

memory means for storing indications of the responses from the terminal response consoles to a question from the central console, said responses being supplied to the central console by the terminal response consoles via the answer line of the intercommunication channel, said memory means comprising a plurality of stages, each stage associated with an individual terminal response console and storing the response supplied therefrom to the central console via said answer line of the intercommunication channel; and control means connected to said scanning means and to said memory means for selectively preventing or permitting the selection of each terminal response console for connection to the central console via said call line of the intercommunication channel depending on the response from said terminal response console to a previous question, which response is stored in the associated stage of the memory means;

whereby the response which a terminal response console gives to a question determines whether this terminal response console will be selected or not by the scanning means for connection to the central console via said call line.

2. A group response analyzing system as in claim 1 wherein the control means include means connected to the intercommunication channel for determining if the response supplied via said answer line of the intercommunication channel by each of the terminal response consoles represents a correct answer or a wrong answer, and wherein the means for selectively preventing or permitting the selection of each terminal response console for connection to the central console via said call line of the intercommunication channel include means responsive to the determining means for permitting the selection, for connection to the control console via said call line of the intercommunication channel of only those terminal response consoles which have supplied a selected one of said correct and wrong answer.

3. A group response analyzing system as in claim 2 wherein the means for selectively preventing or permitting the selection of each terminal response console permits, for the next question, only the selection of terminal response consoles which have supplied a correct answer, as determined by the determining means.

4. A group response analyzing system comprising: a central console for a questioner, a plurality of terminal response consoles for questionees, an intercommunication channel connecting said central console and terminal response consoles to transmit information therebetween, said information including responses by the questionees to each of a succession of questions posed by the questioner, the response from each terminal response console to each question being one of a plurality of defined responses, a scanner for successively selecting individual terminal response consoles to supply to the central console a response to a question by each selected terminal response console via said intercommunication channel, means for determining which of said plurality of defined responses is supplied by each terminal response console in response to the question, and means for processing the responses supplied to the central console, wherein the improvement comprises:

a call line selectively connecting each terminal response console to the central console; and a mode selector comprising:

means for selecting a first operational mode in which said call line connects all terminal response consoles to the central console, for communication therewith over the call line; and means for selecting a second mode in which only the terminal response consoles which have supplied a selected one of said plurality of defined responses to the central console, as determined by said determining means, remain connected to the central console for communication therewith over the call line, while all other terminal response consoles are disconnected from said call line.

* * * * *